(12) United States Patent
Chung et al.

(10) Patent No.: US 9,970,542 B2
(45) Date of Patent: May 15, 2018

(54) SHIFT FORK HAVING IMPROVED ABRASION RESISTANCE

(71) Applicant: Hyundai Motor Company, Seoul (KR)

(72) Inventors: Min Gyun Chung, Gyeonggi-Do (KR); Jeong Uk An, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 649 days.

(21) Appl. No.: 14/557,501

(22) Filed: Dec. 2, 2014

(65) Prior Publication Data

US 2016/0061321 A1    Mar. 3, 2016

(30) Foreign Application Priority Data

Aug. 28, 2014    (KR) .................. 10-2014-0113466

(51) Int. Cl.

| | | |
|---|---|---|
| *F16H 63/32* | (2006.01) | |
| *B32B 15/01* | (2006.01) | |
| *B05B 7/00* | (2006.01) | |
| *C23C 4/06* | (2016.01) | |

(52) U.S. Cl.
CPC .............. *F16H 63/32* (2013.01); *B05B 7/00* (2013.01); *B32B 15/01* (2013.01); *C23C 4/06* (2013.01)

(58) Field of Classification Search
None
See application file for complete search history.

(56) References Cited

U.S. PATENT DOCUMENTS 9,664,281 B2 * 5/2017 Kamura ................. F16J 9/26

FOREIGN PATENT DOCUMENTS

| JP | H0299218 A | 4/1990 |
|---|---|---|
| JP | H07-214250 A | 8/1995 |
| KR | 10-2003-0087111 A | 11/2003 |
| KR | 10-2003-0090206 A | 11/2003 |
| KR | 10-2006-0086062 | 7/2006 |
| KR | 10-0666773 | 1/2007 |
| KR | 10-2009-0026973 | 3/2009 |
| KR | 10-2013-0112636 | 10/2013 |
| KR | 10-2013-0114831 | 10/2013 |

* cited by examiner

*Primary Examiner* — Daniel J. Schleis
(74) *Attorney, Agent, or Firm* — Mintz Levin Cohn Ferris Glovsky and Popeo, P.C.; Peter F. Corless

(57) ABSTRACT

A shift fork having an improved abrasion resistance includes two or more coating layers in which a molybdenum (Mo) sprayed coating layer and a copper (Cu) sprayed coating layer are alternately formed on a surface of a pad.

9 Claims, 3 Drawing Sheets

SHIFT FORK HAVING IMPROVED ABRASION RESISTANCE

CROSS-REFERENCE TO RELATED APPLICATION

The present application claims under 35 U.S.C. § 119(a) the benefit of Korean Patent Application No. 10-2014-0113466, filed Aug. 28, 2014, which is incorporated by reference herein in its entirety.

BACKGROUND (a) Technical Field

The present invention relates to a shift fork with improved abrasion resistance achieved by forming metal coating on a pad of the shift fork, which is a control system component of a manual transmission which changes stages of the transmission based on manipulation of a gearshift lever, and more particularly to a shift fork having excellent abrasion resistance in which a molybdenum (Mo) sprayed coating layer having a high hardness and an excellent abrasion resistance and a copper (Cu) sprayed coating layer having excellent low frictional characteristics are formed to have a multilayered structure.

(b) Description of the Related Art

In general, a gearshift lever is manipulated to change a speed of a vehicle according to a driving condition of the vehicle such that a gear ratio of the transmission receiving a rotating force of an engine can be changed, and the gear ratio of the transmission is manipulated by the medium of a shift fork which engages the gears according to the state of the transmission through manipulation of the gearshift lever.

The shift fork has a substantially U shape to apply a force while surrounding a gear of the transmission, that is, a sleeve, and is manufactured generally through die casting by using an aluminum alloy.

The existing shift fork is generally manufactured through die casting by using a hypereutectic aluminum alloy (R14) containing silicon (Si) through a hypereutectic process, but it is sufficient to provide only the portion of the shift fork that contacts the sleeve with a strong abrasion resistance. However, if the entire shift fork is formed with the hypereutectic aluminum alloy (R14), then excess material is used and processing efficiency is low, and thus manufacturing costs are high.

The conventional art discloses a method of manufacturing a shift fork including a method of forming an aluminum/alumina thick film at a portion of a shift fork contacting a sleeve using a low temperature spraying coating method. The coating layer formed through the method uses a hypereutectic aluminum alloy (ADC12) which is inexpensive as the material of the shift fork securing an abrasion resistance of a coating layer corresponding to the abrasion resistance of an existing hypereutectic aluminum alloy material as well as guaranteeing a sufficient attaching force, so that waste of the material can be prevented and processing efficiency can be increased. In particular, manufacturing costs can be remarkably reduced.

However, even in this case, abrasion resistance is not sufficient, and a surface of a coating layer may be peeled off by friction.

SUMMARY

The present invention provides a shift fork having an abrasion resistance higher than that of an existing shift fork by forming a coating having a molybdenum (Mo)-copper (Cu) multilayer structure of a high abrasion resistance and a low frictional coefficient in a pad of the shift fork through a spraying method, and a method of manufacturing the same.

In one aspect, the present invention provides a shift fork having an improved abrasion resistance, wherein two or more coating layers in which at least one molybdenum (Mo) sprayed coating layer and at least one copper (Cu) sprayed coating layer are alternately formed on a surface of a pad.

A layer of the coating layer contacting the pad is a molybdenum sprayed coating layer and a layer of the coating layer exposed to the outside is a copper sprayed coating layer.

The thickness of the coating layer is about 100 µm to 200 µm.

The molybdenum sprayed coating layer is about 10 µm to 20 µm, and the copper sprayed coating layer is about 5µ to 10 µm.

In another aspect, there is provided a method of manufacturing a shift fork having an improved abrasion resistance, the method including the steps of: preparing a shift fork; and forming two or more coating layers in which at least one molybdenum (Mo) sprayed coating layer and at least one copper (Cu) sprayed coating layer are alternately formed while the shift fork is rotated, on a surface of a pad.

The method further includes forming fine convexo-concaves on the pad of the shift fork through short blasting before the coating step.

In the step of forming the two or more coating layers, the molybdenum coating layer is formed by a molybdenum spraying gun, and the copper coating layer is formed by a copper spraying gun installed at upper portions of opposite sides of a rotary plate while the shift fork is located on the rotary plate.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
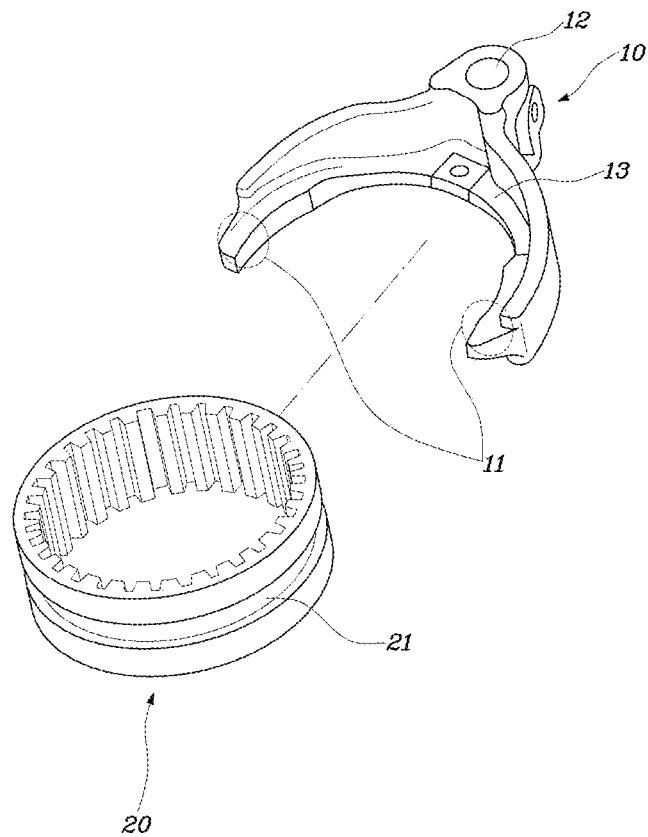
FIG. 1 is a perspective view showing a shift fork according to an embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a shift fork having an improved abrasion resistance according to an exemplary embodiment of the present invention will be described with reference to the accompanying drawings.

FIG. 1 is a perspective view showing a shift fork according to an embodiment of the present invention.

The shift fork will be described with reference to FIG. 1. The shift fork 10 shown in FIG. 1 corresponds to a two-point support method, but the present invention is not limited thereto. The two-point support type shift fork 10 shown in the drawing includes a semi-arc shaped body 13, and pads 11 having a thickness larger than the thickness of the body 13 and inserted into a groove 21 of a sleeve 20 to catch and move the sleeve 20 during a gearshift operation. A coupling part 12 mounted on and coupled to a shift rail is formed at an upper end of the body 11.

If a gearshift operator manipulates a gearshift lever such that a manipulation force is transferred to the shift fork 10 via a control shaft, a control finger, and a shift rail, the pads 11 formed at opposite ends of the body 13 are inserted into the grooves 21 of the sleeve 20 to push the sleeve 20 toward a gearshift stage desired by the driver. Accordingly, a gearshift gear is directly connected to a rotary shaft while the sleeve 20 is axially moved, and thereby shifting gears. Accordingly, a coating layer having excellent abrasion resistance and frictional characteristics is required to improve the durability of the pad 11 of the shift fork 10.

Figure 2:
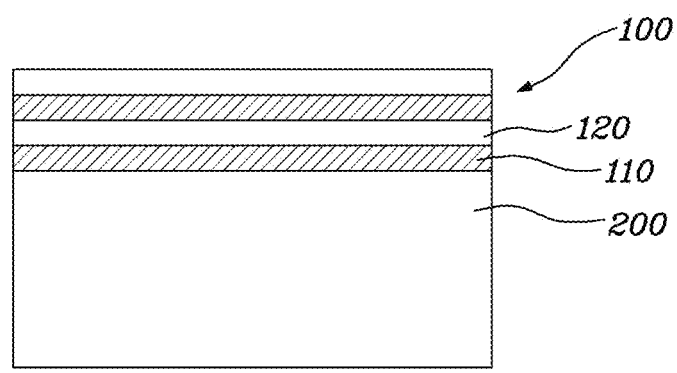
FIG. 2 is a view showing a coating layer formed in a pad of the shift fork according to the embodiment of the present invention.

FIG. 2 is a view showing a coating layer formed in a pad of the shift fork according to the embodiment of the present invention. In order to improve the abrasion resistance of the shift fork, a coating layer 100 formed in the shift fork according to the present invention may be configured by alternately forming molybdenum (Mo) sprayed coating layers 110 and copper (Cu) sprayed coating layers 120 in the pad 200 of the shift fork. In particular, at least one molybdenum sprayed coating layer 110 and at least one copper sprayed coating layer 120 should be formed; if additional layers are used, the respective layers preferably are alternated.

It is preferable that the molybdenum (Mo) sprayed coating layers 110 and the copper (Cu) sprayed coating layers 120 forming the coating layer 100 are alternately formed. It is difficult to form Molybdenum (Mo) and copper (Cu) into an alloy and cracks can be prevented from propagating in a thickness direction of the coating layer by alternately forming the alloy layers into a multilayered structure. Accordingly, the abrasion resistance can be improved as compared with a single coating layer.

The molybdenum (Mo) sprayed coating layer 110 corresponds to a hard coating layer having a high hardness, an excellent thermal resistance, and an excellent abrasion resistance. It is preferable that the thickness of the molybdenum (Mo) sprayed coating layer (110) is about 10 μm to 20 μm. When the thickness of the molybdenum (Mo) sprayed coating layer 110 is less than about 10 μm, the abrasion resistance is lowered, and when the thickness of the molybdenum (Mo) sprayed coating layer 110 exceeds about 20 μm, the low friction characteristics deteriorate. Accordingly, the thickness of the molybdenum (Mo) sprayed coating layer 110 is limited to the range to improve the abrasion resistance and reduce the friction.

The copper (Cu) sprayed coating layer 120 corresponds to a soft coating layer having excellent low friction characteristics. It is preferable that the thickness of the copper (Cu) sprayed coating layer (120) is about 5 μm to 10 μm. When the thickness of the copper (Cu) sprayed coating layer 120 is less than about 5 μm, it is difficult to show the low friction characteristics, and when the thickness of the copper (Cu) sprayed coating layer 120 exceeds 10 μm, the abrasion resistance of the entire coating layer may be reduced. Accordingly, the thickness of the copper (Cu) sprayed coating layer 120 is limited to the range to improve the abrasion resistance and reduce the friction.

It is preferable that the overall thickness of the coating layer is about 100 μm to 200 μm.

It is preferable that a layer of the coating layer contacting the pad 200 corresponds to a molybdenum (Mo) coating layer 110 to secure a load support force of the coating layer. Meanwhile, it is preferable that a layer of the coating layer exposed to the outside is a copper (Cu) sprayed coating layer 120 to reinforce low friction characteristics.

Pores may be present in the outermost coating layer of the copper (Cu) sprayed coating layer. The pores are filled with oil during an oil condition friction, and when oil is not supplied, a lubrication effect can be shown through the oil present in the pores.

Figure 3:
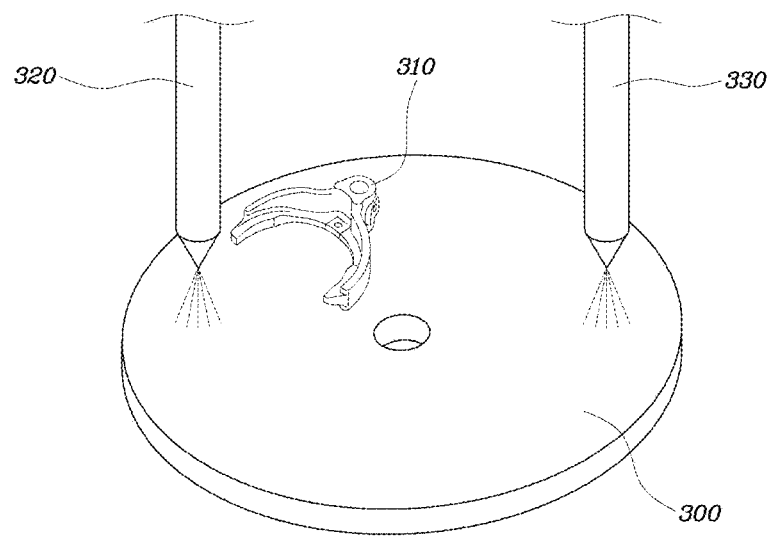
FIG. 3 is a diagram schematically showing an apparatus for manufacturing a shift fork according to an embodiment of the present invention.

FIG. 3 is a diagram schematically showing an apparatus for manufacturing a shift fork according to an embodiment of the present invention. Referring to FIG. 3, a method of manufacturing a shift fork according to an embodiment of the present invention will be described.

The method of manufacturing a shift fork according to the embodiment of the present invention includes a preparation step of preparing a shift fork, and a coating step of forming a coating layer having two or layers in which molybdenum (Mo) sprayed coating layers and copper (Cu) sprayed coating layers are alternately formed while the shift fork is rotated on a surface of a pad.

First, a shift fork 310 is prepared. The shift fork may be any generally used material, but an aluminum alloy is preferable.

A coating layer is formed in a pad while the prepared shift fork 310 is rotated after being located on a rotary plate 300. Because it is difficult to form Molybdenum (Mo) and copper (Cu) into an alloy, according to the present invention, Molybdenum (Mo) and copper (Cu) are alternately coated through a molybdenum spraying gun 320 and a copper spraying gun 330 which can separately coat Molybdenum (Mo) and copper (Cu), thereby making it possible to form a multilayer heterostructure.

Then, when molybdenum (Mo) and copper (Cu) are sprayed and coated, their materials may be wires or powder. The spraying method may be various methods such as flame spraying, high velocity flame spraying, and plasma spraying.

A step of activating a surface of the pad by short blasting alumina particles on the surface of the pad and forming fine convexo-concaves may be further provided to secure a bonding force between the pad and the coating layer before the coating layer is formed.

EXPERIMENTAL EXAMPLE

Mo—Cu complex coating of a thickness of 150 μm was performed on the pad of the shift fork in a flame spraying method to identify properties of the shift fork according to the present invention (First embodiment).

Figure 4:
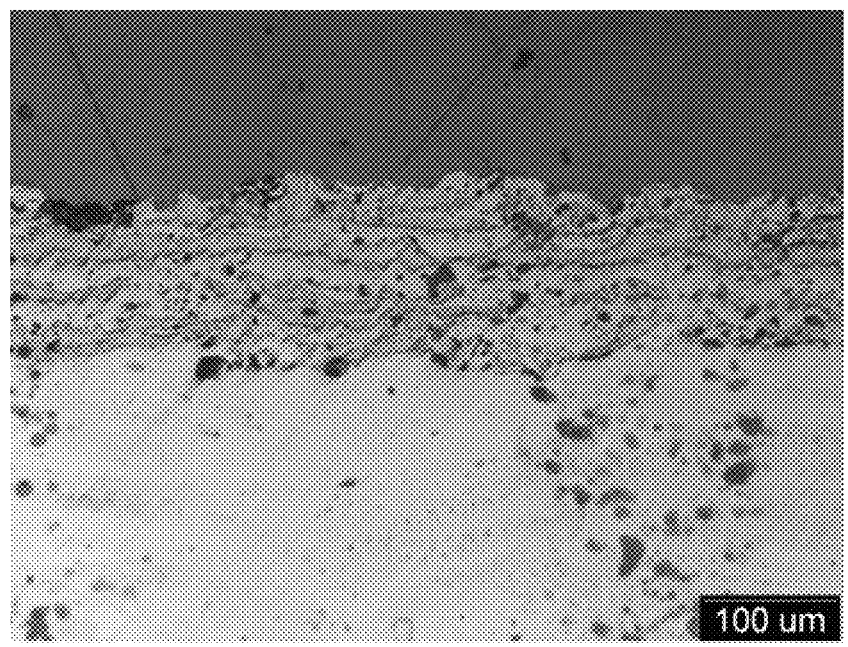
FIG. 4 is an electron microscope picture showing a Mo—Cu complex coating layer formed in the pad of the shift fork according to the present invention.

FIG. 4 is an electron microscope picture showing an Mo—Cu complex coating layer formed in the pad part of the shift fork according to the present invention. As shown in FIG. 4, it can be seen that molybdenum coating layers and copper coating layers are alternately formed on a surface of the pad.

Mo coating having a thickness of 120 μm was performed on the pad of the shift fork in a flame spraying method to compare an effect of the present invention.

The properties of the first embodiment and Comparative Example 1 are shown in Table 1.

TABLE 1

|  | Coating layer | Roughness (μm) | Hardness (Hv) | Frictional coefficient | abrasion loss (μm/h) |
|---|---|---|---|---|---|
| First embodiment | Mo—Cu | Rz 35.0 | 900 | 0.18 | 0 |
| Comparative example | Mo | Rz 32.0 | 650 | 0.15 | 0 |

Figure 5A:
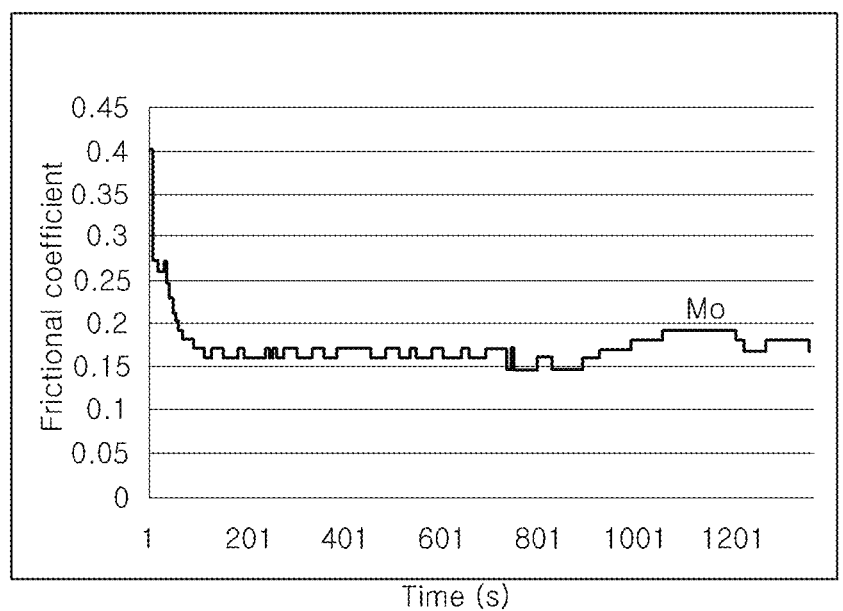
FIG. 5A is a graph depicting frictional coefficients according to time of Comparative Example 1.
Figure 5B:
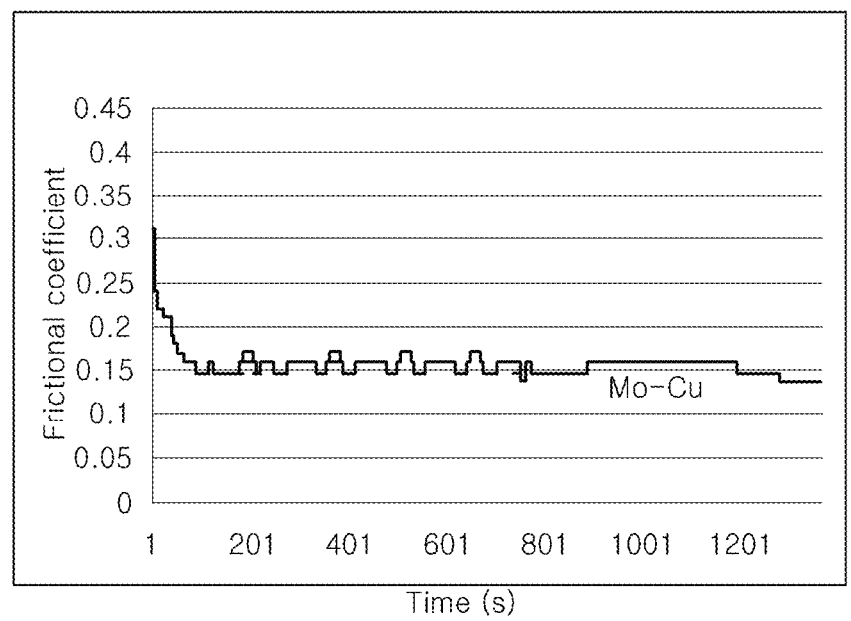
FIG. 5B is a graph depicting frictional coefficients according to time of an embodiment of the present invention.

In order to compare frictional coefficients and abrasion resistances, frictional coefficients between coating layers and disks (SCr420 HB) were measured through a pin-on-disk frictional abrasion tester. The test condition was a load of 500 N, a temperature of 100° C., and an oil condition, which is a driving condition of the shift fork. FIG. 5A is a graph depicting frictional coefficients according to time of Comparative Example 1. FIG. 5B is a graph depicting frictional coefficients according to time of a first embodiment of the present invention. It can be seen that low frictional characteristics are improved by lowering frictional coefficients while abrasion resistance of a predetermined level or more is maintained as compared with an existing molybdenum single layer, by combining molybdenum and copper, that is, alternately forming hard layers and soft layers to form a coating layer.

The shift fork having an improved abrasion resistance according to the present invention has the following effects.

First, because a frictional coefficient of an oil condition is lower by about 10% than that of an existing single molybdenum (Mo) coating layer, frictions can be reduced.

Second, because propagation of cracks in the direction of a mother substrate by a multilayered coating layer can be prevented, an abrasion resistance level of the coating layer is a level equal to or higher than that of the basic single molybdenum (Mo) coating layer.

Third, because manufacturing costs can be reduced by about 40% as compared with the related art, productivity can be improved.

Although the exemplary embodiments of the present invention have been described with reference to the accompanying drawings, it will be appreciated by those skilled in the art that the present invention may be carried out in other detailed forms without changing the technical spirit or essential characteristics of the present invention.

Therefore, it should be noted that the above-described embodiments are exemplary in all aspects, and are not restrictive. It is also noted that the scope of the present invention is defined by the claims rather than the description of the present invention, and the meanings and ranges of the claims, and all modifications deduced from the concept of equivalents fall within the scope of the present invention.

What is claimed is:

1. A shift fork, comprising:
   two or more coating layers in which at least one molybdenum (Mo) sprayed coating layer and at least one copper (Cu) sprayed coating layer are alternately formed on a surface of a pad,
   wherein the molybdenum sprayed coating layer contacts the pad, and the copper sprayed coating layer is exposed to outside of the shift fork.

2. The shift fork of claim 1, wherein the thickness of the coating layers is about 100 μm to 200 μm.

3. The shift fork of claim 2, wherein the molybdenum sprayed coating layer is about 10 to 20 μm thick, and the copper sprayed coating layer is about 5 to 10 μm thick.

4. The shift fork of claim 1, wherein the molybdenum and copper coating layers provide improved abrasion resistance as compared to the shift fork without the coating layers.

5. A method of manufacturing the shift fork of claim 1, the method comprising the steps of:
   preparing a shift fork; and
   forming two or more coating layers in which at least one molybdenum (Mo) sprayed coating layer and at least one copper (Cu) sprayed coating layer are alternately formed while the shift fork is rotated, on a surface of a pad.

6. The method of claim 5, further comprising the step of:
   forming fine convexo-concaves on a surface of the pad of the shift fork through short blasting before the coating step.

7. The method of claim 5, wherein in the step of forming the two or more coating layers, a molybdenum spraying gun and a copper spraying gun installed at upper portions of opposite sides of a rotary plate are used for producing the molybdenum and copper sprayed coating layers, respectively, while the shift fork is located on the rotary plate.

8. The method of claim 5, wherein the molybdenum and copper coating layers provide improved abrasion resistance as compared to the shift fork without the coating layers.

9. A shift fork, comprising:
   at least one molybdenum (Mo) sprayed coating layer and at least one copper (Cu) sprayed coating layer that are alternately formed on a surface of a pad,
   wherein the molybdenum sprayed coating layer contacts the pad, and the copper sprayed coating layer is exposed to outside of the shift fork.

* * * * *